(12) United States Patent
Braun et al.

(10) Patent No.: US 7,608,346 B2
(45) Date of Patent: Oct. 27, 2009

(54) MAGNETIC FIELD SENSOR

(75) Inventors: Alexander Braun, Pforzheim (DE); Andreas Herzberger, Goeppingen (DE); Steffen Waldenmeier, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 533 days.

(21) Appl. No.: 11/296,766

(22) Filed: Dec. 7, 2005

(65) Prior Publication Data

US 2006/0132126 A1    Jun. 22, 2006

(30) Foreign Application Priority Data

Dec. 20, 2004   (DE) .................. 10 2004 061 260

(51) Int. Cl.
*G01P 3/42* (2006.01)
(52) U.S. Cl. ................ 428/692.1; 324/146; 324/151 R; 324/174
(58) Field of Classification Search ............... None
See application file for complete search history.

(56) References Cited

U.S. PATENT DOCUMENTS

| 5,274,911 | A | * | 1/1994 | Toro | 29/827 |
|---|---|---|---|---|---|
| 5,488,294 | A | * | 1/1996 | Liddell et al. | 324/207.21 |
| 5,682,095 | A | * | 10/1997 | Mathes et al. | 324/174 |
| 6,053,046 | A | * | 4/2000 | Masaki et al. | 73/514.39 |
| 6,291,990 | B1 | * | 9/2001 | Nakane et al. | 324/207.25 |
| 6,373,241 | B1 | * | 4/2002 | Weber et al. | 324/207.2 |
| 7,269,992 | B2 | * | 9/2007 | Lamb et al. | 73/1.41 |
| 7,463,019 | B2 | * | 12/2008 | Kaltenbach et al. | 324/173 |

FOREIGN PATENT DOCUMENTS

EP    0 898 180    9/2000

* cited by examiner

*Primary Examiner*—Kevin M Bernatz
(74) *Attorney, Agent, or Firm*—Michael J. Striker

(57) ABSTRACT

A magnetic field sensor, in particular an rpm sensor and/or rotational direction sensor and/or position sensor for the drive train of a motor vehicle, has a sensor array, with a sensor element that responds to a magnetic field, and optionally with a permanent magnet, the latter being sheathed with plastic jointly with the sensor array and parts of terminal conductor tracks, and the conductor tracks are embodied in one piece with a fixing element for the permanent magnet and the sensor array as a stamped grid, wherein stamped grid is shaped as a three-dimensional structure which carries the sensor array and optionally embraces the permanent magnet in the manner of a mount, and the mount and the terminal conductor tracks are first stamped out from a metal sheet as a gridlike developed form, and then deformed to form the mount.

12 Claims, 4 Drawing Sheets

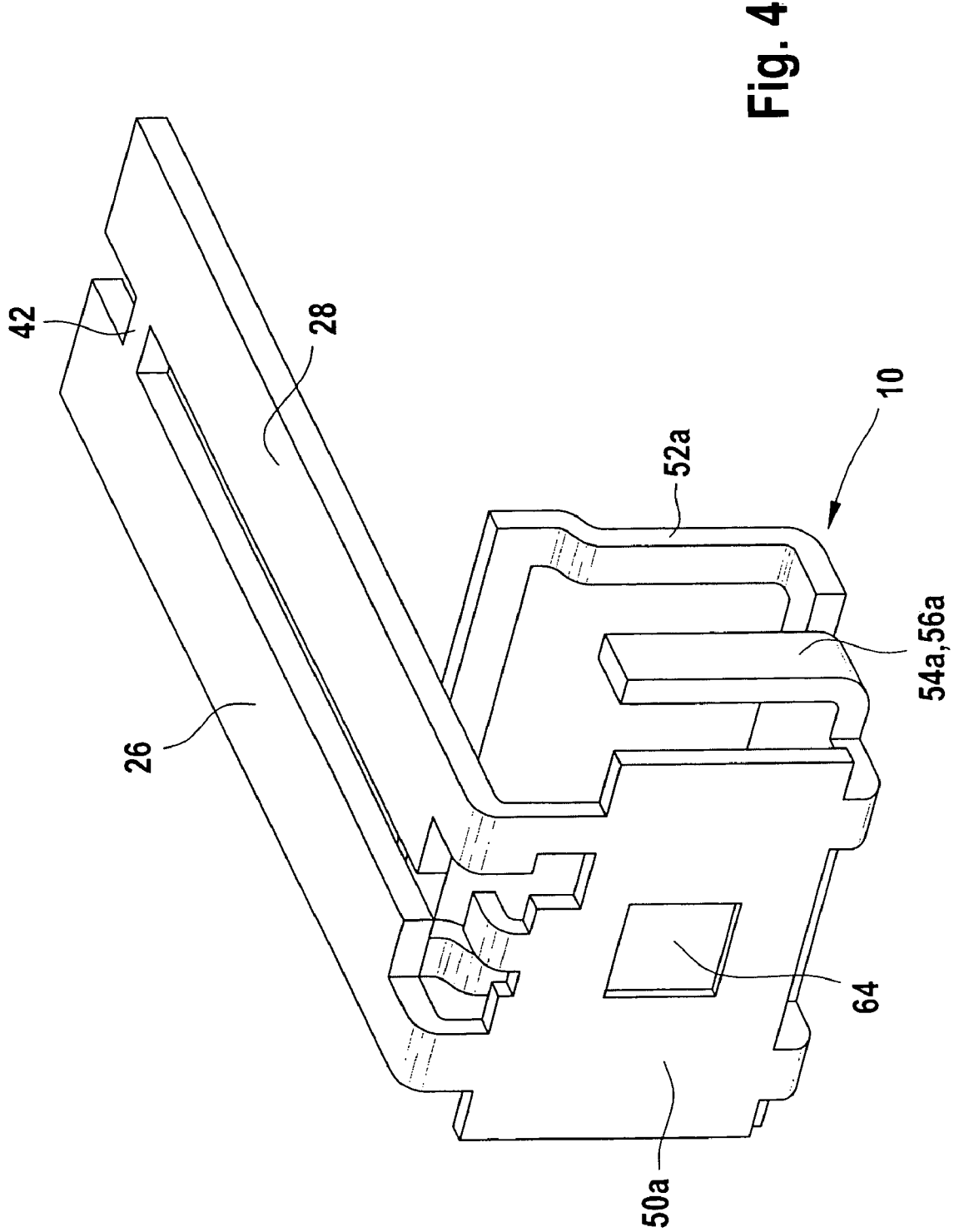

MAGNETIC FIELD SENSOR

CROSS-REFERENCE TO RELATED APPLICATIONS

This application claims priority under 35 U.S.C. 119 (a)-(d) to German Patent Application DE 10 2004 061 260.9, filed Dec. 20, 2004.

BACKGROUND OF THE INVENTION

The invention relates to a magnetic field sensor, in particular an rpm sensor and/or a rotational direction sensor and/or a position sensor, preferably for the drive train of a motor vehicle, and to a method for producing such a sensor, of the kind disclosed for instance by European Patent Disclosure EP 0 898 180 A.

This reference shows a frame for installing a magnetic field sensor that has crossbars for fixing a permanent magnet and also has a plurality of terminal conductor tracks for a sensor array, which in turn upon installation and with a later plastic potting rests on a flat portion of the frame. Such an arrangement on the one hand fails to assure exact positioning of the sensor components and on the other fails to provide an exact association between the permanent magnet and the sensor array, since the permanent magnet and the sensor array are fixed by separate parts of the frame, and furthermore the clamping mounting of the permanent magnet takes place regardless of the positioning of the sensor array.

SUMMARY OF THE INVENTION

It is therefore an object of the present invention to provide a magnetic field sensor, and a method for producing such a sensor, which constitute a further improvement of the known sensors and methods for producing the same.

More particularly, it is an object of the present invention to provide a magnetic field sensor and a method for producing it which are distinguished by low tolerance fields both in product design and in terms of the manufacturing steps. High product and manufacturing precision are further intended to assure an exact position of the magnetic field sensor relative to a detection target, or in other words, in the preferred application, a small air gap that can be adhered to exactly, compared to a transducer wheel, which on its circumference has ferromagnetic teeth or magnetic poles that move past the sensor and that to ascertain the rpm and/or the direction of rotation and/or the position alternate with tooth gaps or pole gaps.

Instead of a transducer wheel, a rack or pole rod can serve as the transducer structure; in the case of a transducer array with magnetic poles (multipole structure), there is no magnet in the magnetic field sensor.

In keeping with these objects and with others which will become apparent hereinafter, one feature of the present invention resides, briefly stated, in a A magnetic field sensor, comprising a sensor array with a sensor element that responds to a magnetic field; terminal conductor tracks; fixing means for said sensor array, sheathing means which sheath said sensor array and parts of said terminal conductor tracks in plastic, said conductor tracks being configured in one piece with said fixing means as a stamped grid, said stamped grid being configured as a three-dimensional structure in a region adjacent to a transducer array and carrying said sensor array on a face-end portion.

Another feature of the present invention resides, briefly stated, in a method for producing a magnetic field sensor which has a sensor array with a sensor element that responds to a magnetic field, wherein the sensor array and parts of terminal conductor tracks are sheathed in plastic and the conductor tracks are configured in one piece with the fixing means for the sensor array as a stamped grid, the method comprising the steps of stamping out first a grid-shaped developed form of a mount for elements selected from the group consisting of sensor array, the terminal conductor tracks, and both, from a metal sheath; and then shaping the grid-shaped developed form of a mount into the mount in a region of the sensor array, and optionally further components.

It has proved structurally advantageous if in addition to the sensor array, a permanent magnetic transducer is retained and positioned in the stamped grid structure, and the stamped grid structure at least partly embraces the permanent magnet. It is expedient if the stamped grid, which carries the active parts of the sensor, comprises a copper bronze, such as CuSn6, because such an alloy on the one hand has high stability and elasticity and on the other can be joined with difficulty and securely to the terminals of the sensor array, preferably by welding/bonding. Instead of a copper bronze, aluminum alloys, such as AlMgSi1, and copper-iron alloys with a low proportion of iron, such as CuFe2P, are also suitable as stamped grid materials.

For harmonizing the magnetic field generator by means of a permanent magnet in the sensor, it is advantageous if a ferromagnetic scattering disk is associated with the permanent magnet, on the face end of the permanent magnet toward the sensor element, and this scattering disk can likewise be securely held and positioned in the mount for the permanent magnet between the magnet and the sensor array. In versions with an external magnetic transducer structure, the scattering disk in the sensor is also omitted.

For precise bracing and alignment of the sensor array and the permanent magnet, it is also advantageous if the mount parts provided for it have elastically deformable portions for clampingly receiving the permanent magnet and/or the scattering disk and/or the sensor, and the deformable portions embrace at least the permanent magnet, over part of its surface, by form-locking and rest with tension on the surface of the magnet.

With regard to the method of the invention for producing the magnetic field sensor, it is especially expedient if, for embodying the mount of the sensor array and optionally further components, first a gridlike developed form of the mount and the terminal conductor tracks is stamped out of a metal sheet and then shaped into the mount, which continues in one piece into the conductor tracks, by bending, embossing or other suitable methods. It is especially expedient in this respect if both the stamping of the grid and its shaping are done in a follow-on composite tool, in which still other provisions, such as equipping the mount with the permanent magnets, the sensor array, a scattering disk, and optionally other parts, can be done without changing tools. The concluding sheathing and external designing of the magnetic field sensor are expediently done by casting or spray-coating the entire array, except for the conductor track ends, with plastic.

The novel features which are considered as characteristic for the present invention are set forth in particular in the appended claims. the invention itself, however, both as to its construction and its method of operation, together with additional objects and advantages thereof, will be best understood

BRIEF DESCRIPTION OF THE DRAWINGS

FIG. 4 is a perspective view of a further version of a stamped grid mount.

DESCRIPTION OF THE PREFERRED EMBODIMENTS

Figure 1:
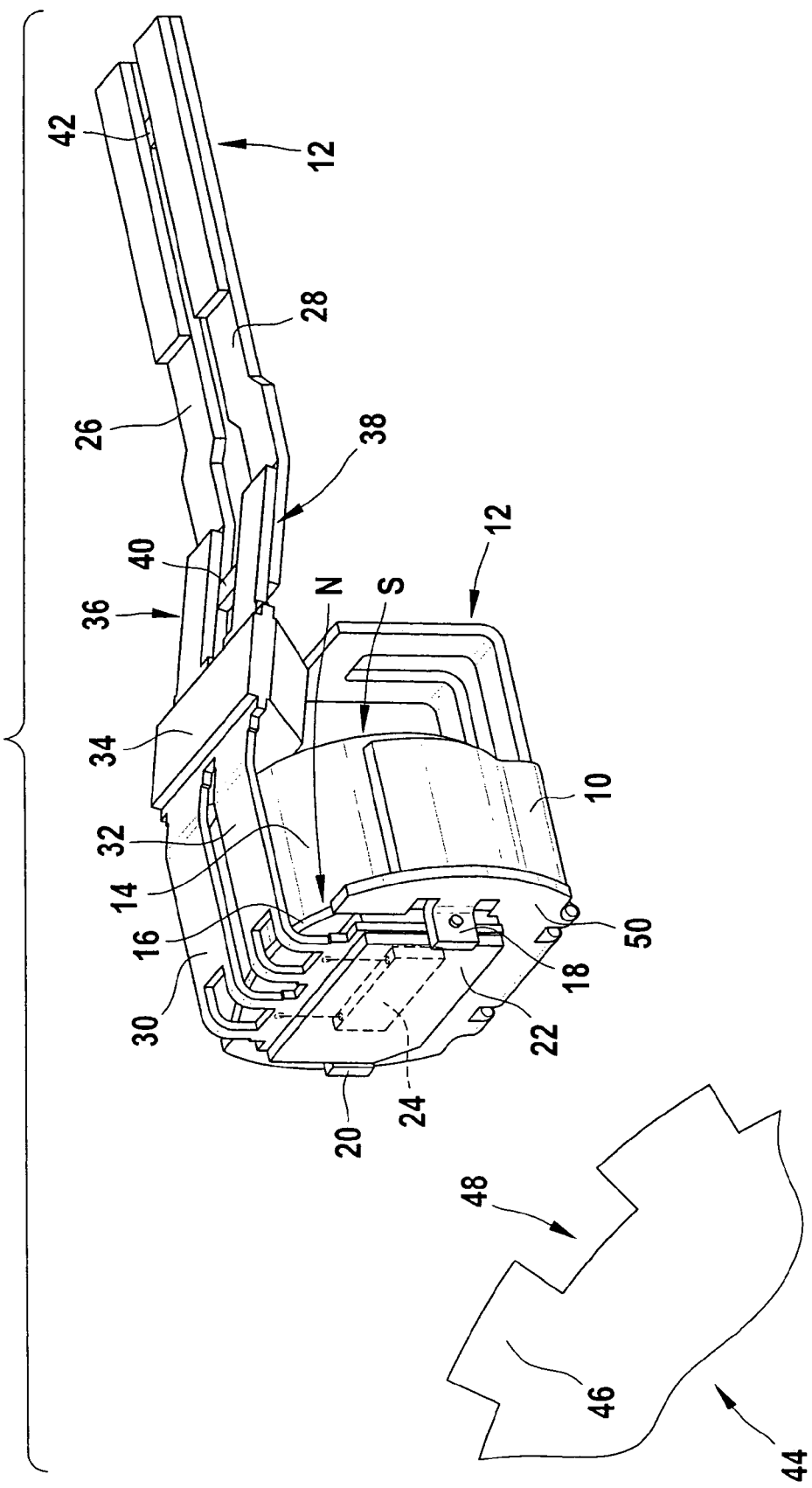
FIG. 1 is a perspective view of a completely shaped, assembled magnetic field sensor before its being sheathed with plastic.

FIG. 1 shows a magnetic field sensor before it is sheathed with plastic, of the kind that can be used for instance as an rpm sensor and simultaneously as a rotational direction sensor for the transmission of a motor vehicle. Reference numeral 10 indicates a mount for the various components of the sensor, which is stamped out of a metal sheet of copper bronze (CuSn6) as a developed form of the mount 10 in the form of a flat stamped grid 12. A round or oval, axially magnetized permanent magnet 14 is seated in the mount and is located such that on its left-hand face end, it has a north pole (N), and on its right-hand face end it has a south pole (S). Seated inside the mount 10, on the north pole face end of the permanent magnet 14, is a scattering disk 16 of soft iron, which has only a slight thickness and is kept in saturation by the field of the magnet, so that the magnetic field is harmonized, and an extensively constant field intensity in the measurement region preceding the north pole of the magnet is assured.

Outside the mount 10, parallel to the end face of the permanent magnet 14, the actual sensor array 22 is held between two clamps 18 and 20; it is embodied as an IC component and includes a sensor element 24, indicated by dashed lines, in the form of a Hall element.

The mount 10 is designed in one piece in accordance with the geometry of the original stamped grid 12 and is embodied with two conductor tracks 26 and 28; the conductor track 26 forms the ground connection, and the conductor track 28 the signal connection with the sensor element 24. The permanent magnet 14 is also connected to ground. The internal terminals of the sensor element 24 are indicated only by dashed lines; toward the outside, the sensor array 22 has terminal leads 30 and 32, which are welded at their ends to the conductor tracks 26 and 28. In the middle region, the terminal leads 30 and 32, to protect against overvoltages, are bridged by a capacitor 34.

The ends of the conductor tracks 26 and 28, in the part protruding out of the later plastic potting and for some distance onward into the plastic as well, are reinforced, for instance by folded-over portions 36 and 38, to twice the thickness of the material of the stamped grid 12. Moreover, in this stage of manufacture before the concluding potting for stabilizing the array, the conductor tracks 26 and 28 are also held together by webs 40 and 42; at least the web 40 is already removed before the concluding potting. Finally, FIG. 1 also schematically indicates a ferromagnetic transducer wheel 44 that cooperates with the sensor array 22 and that on alternatingly moving past teeth 46 and teeth gaps 48, as a result of the change in the magnetic field, generates the signals that are output by the sensor array 22.

Figure 2:
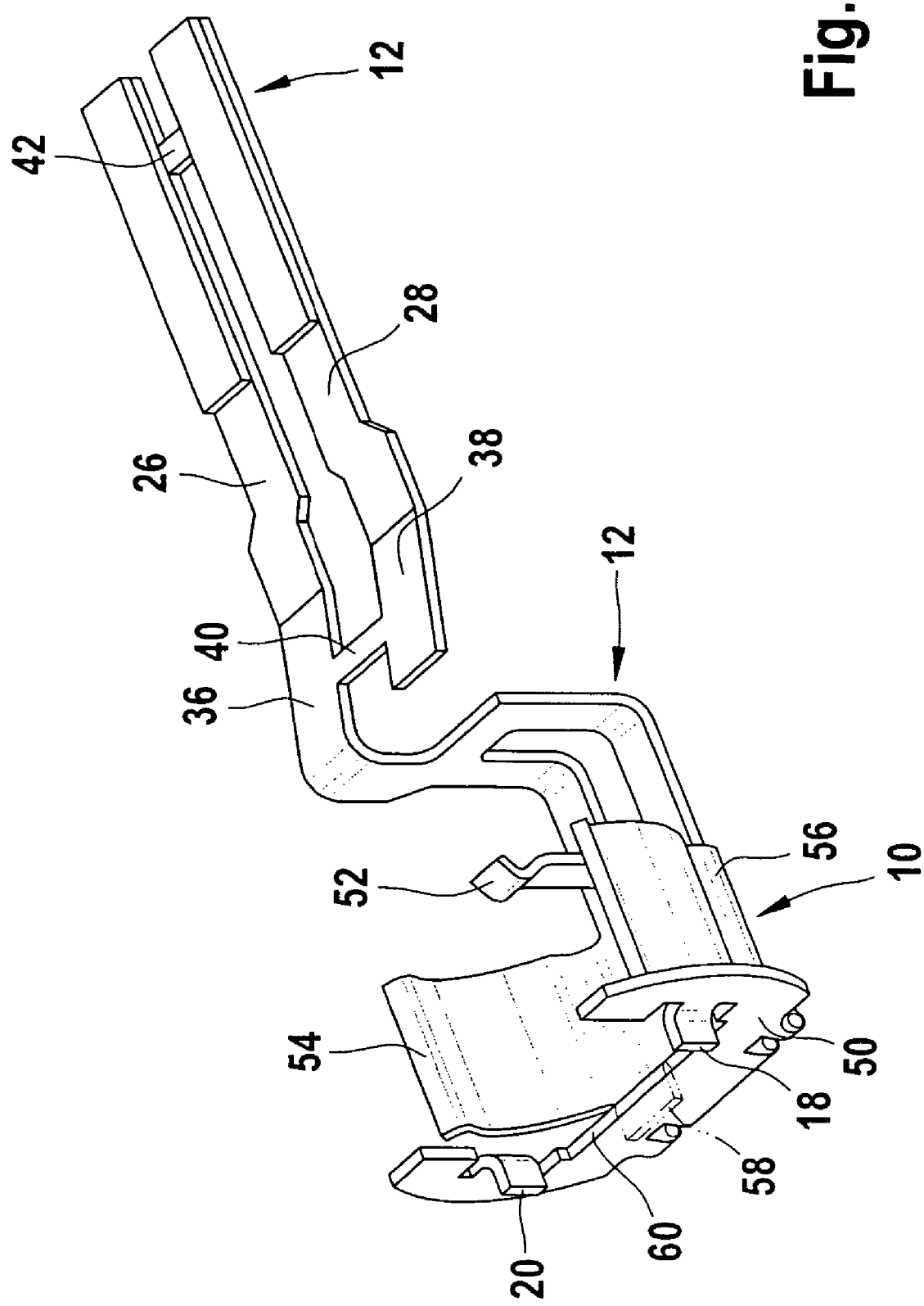
FIG. 2 is a perspective view of the mount of the magnetic field sensor before the assembly.

In the following drawings, identical elements are identified by the same reference numerals as in FIG. 1. FIG. 2 shows the unassembled mount 10, shaped out of the stamped grid 12 in one piece with the conductor tracks 26 and 28. In its front region, this mount has a flange 50, bent at a right angle, on which the permanent magnet 14, with the scattering disk 16 optionally placed on it, is braced on its face end. On the diametrically opposed face end, the permanent magnet 14 is kept under prestressing by a tab 52 and pressed against the flange 50. The lateral fixing of the permanent magnet 14 in the region of its jacket face is effected by two elastic segments 54 and 56, whose design is adapted to the shape of the permanent magnet 14, which in particular may be round, oval, or even rectangular. The two clamps 18 and 20 can be seen on the outer end face of the flange 50 and hold the sensor array 20 by force locking. If needed, however, a further clamp 58 may also be provided in the region of the lower edge of the sensor array 22, to facilitate the positioning upon insertion of the sensor array 22.

With regard to the conductor tracks 26 and 28, in designing the stamped grid 12 the fact has already been taken into account that the conductor track 26 is to establish the ground connection and the conductor track 28 is to establish the signal connection. The conductor track 26 is therefore designed continuously and in one piece with the part of the stamped grid 12 that forms the mount 10, while the conductor track 28 is retained in the stamped grid 12 by webs 40 and 42 during installation. For improving and facilitating the soldered or welded connections, the stamped grid 12 is either made entirely of a galvanically coated sheet of copper or copper bronze, or a sheet of the same material coated on its surface by hot tin coating. In principle, however, it suffices if only the later welding or soldering points are tinned. The thickness of the material of the stamped grid assures adequate mechanical strength.

FIG. 2 further shows that in this embodiment, the flange 50 is not closed at the top on the face end of the mount 10 and leaves an opening 60 free in the middle region that corresponds to the size of the sensor array 22. As a result, the sensor array 22 can extend as far as the face end of the permanent magnet 14, or the face end of the scattering disk 16, so that the fixing and centering of the sensor array 22 are further improved, and the axial installed length is reduced.

Figure 3:
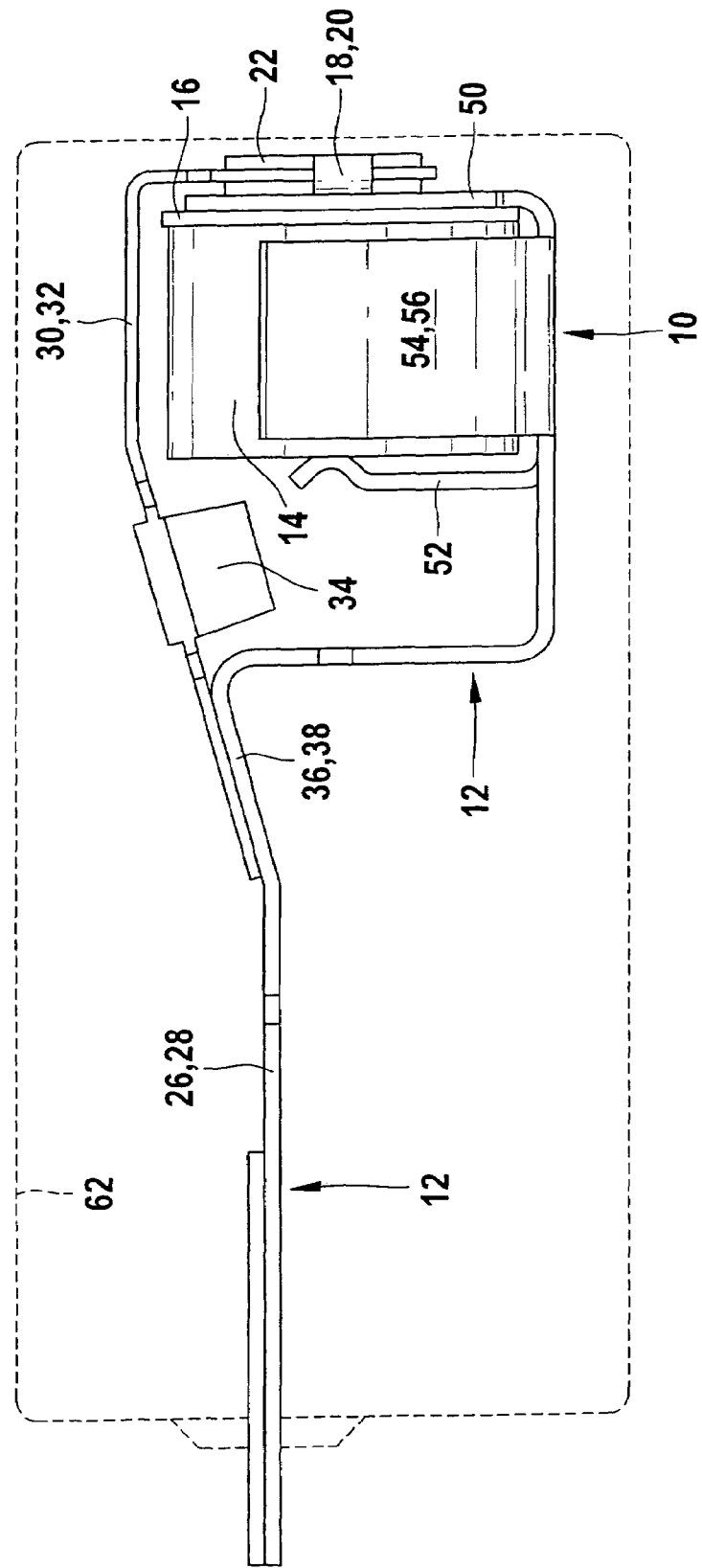
FIG. 3 is a side view of the assembled magnetic field sensor, with the plastic potting shown schematically.

FIG. 3 shows a side view of the magnetic field sensor of FIG. 1, in which the concluding plastic potting 62 is represented symbolically by a dashed line. The outer contour of the plastic 62 is adapted to the applicable installation conditions and is also optimized in terms of the size and shape of the sensor, in order on the one hand to assure high mechanical strength and on the other to minimize the plastic composition, for reducing the thermal and mechanical load on the sensor during production. Otherwise, FIG. 3 again shows the three-dimensional location and mounting of the permanent magnet 14, scattering disk 16 and sensor array 22 in the mount 10 shaped from the stamped grid 12; the permanent magnet and the scattering disk 16 are securely and precisely locked in the interior of the mount 10, while as a result of the installation of the sensor array 22, the air gap toward the transducer wheel 44, not shown in FIG. 3, on the outside of the flange 50 of the mount 10 is minimized.

FIG. 4 shows an alternative for designing the stamped grid 12 or the mount 10 and the conductor tracks 26, 28. The mount 10 here is shaped such that it is suited in particular for receiving a rectangular permanent magnet. Upon installation, a framelike tab 52a, or at least one lateral segment 54a or 54b, is bent upward in the shape shown only after the permanent magnet, not shown, has been introduced. A further distinction is the design of the face-end flange 50a, which in this case has no opening, but instead only has an indentation 64. Since the stamped grid 12 is made not of ferromagnetic material but rather from copper or copper bronze, for instance, the field of the permanent magnet can pass through the flange 50a. The indentation 64 serves to provide exact positioning of the permanent magnet and is especially advantageous whenever the permanent magnet is a so-called gap magnet of substantially U-shaped geometry, so that the indentation 64 reaches into the gap and positions the magnet exactly.

In terms of the manufacture of the magnetic field sensor of the invention, it has already been stated that first, from a metal sheet, a gridlike developed form of the mount 10 and of the terminal conductor tracks 26, 28 is stamped out and is then shaped into the mount 10, in the region of the permanent magnet 14 and the sensor array 22 and optionally of further components, such as the scattering disk 16. Expediently, the manufacture of the magnetic field sensor is done in a so-called follow-on composite tool, in which the stamping of the stamped grid 12 out of a band material and the shaping of the mount 10 with the conductor tracks 26 and 28 and their equipping with the individual components of the sensor are done in successive work steps. Only the concluding potting of the magnetic field sensor with a preferably pressure-setting plastic 62 is then done in a separate operation and in a separate tool.

With the magnetic field sensor of the invention, in the field of sensor systems for engine and transmission management in a motor vehicle, for instance, many different functions can be performed, for instance being used as a phase transducer and/or an rpm transducer. As magnetosensitive measuring elements 24 of the sensor array 22, besides Hall elements, AMR (Anisotropic Magneto-Resistor) and GMR (Giant Magneto-Resistor) elements as well as field plates are used, and when such IC sensor arrays 22 are employed, the requisite exact positioning, for instance relative to a transducer wheel, can be adhered to very precisely and with relatively little expense for material and components. A reduction in tolerances in all directions is thus attained, while simultaneously reducing the number of manufacturing steps in the production of the sensor.

Moreover, the range of function can be expanded while the functional length and diameter are simultaneously reduced, so that greater tolerances are acceptable in terms of the air gap. For mass production, the design according to the invention and the associated production process create the possibility of leaving the stamped grid 12 during production on a carrier strip of the band from which the stamped grid 12 is then cut free. This makes it possible for instance to stir the finished stamped grids, at the end of the bending and stamping process, in rolled-up form until further processing, or to transport them in that form to other production sites. In particular, however, by both holding the magnetic circuit and simultaneously carrying current and signals in one component, a compact, stable, and simply manufactured unit is achieved, which is distinguished by increased precision and reduced production costs.

It will be understood that each of the elements described above, or two or more together, may also find a useful application in other types of constructions differing from the types described above.

While the invention has been illustrated and described as embodied in a magnetic field sensor, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

The invention claimed is:

1. A magnetic field sensor, comprising:
    a mount stamped from a single sheet of metal to form a stamped grid which forms terminal conductor tracks, means for fixing a sensor array on a face-end portion of the mount, and means for seating a permanent magnet formed from the mount itself, wherein a permanent magnet is positioned and locked in said means;
    a sensor array comprising a sensor element that responds to a magnetic field fixed on said means for fixing a sensor array on said mount; and
    sheathing means which sheath said sensor array and parts of said terminal conductor tracks in plastic; and
    said stamped grid is configured such that said face-end portion of said mount is parallel to a face of said permanent magnet.

2. The magnetic field sensor as defined in claim 1, wherein said sheet of metal is a sheet of copper bronze.

3. The magnetic field sensor as defined in claim 2, wherein said copper bronze is CuSn6.

4. The magnetic field sensor as defined in claim 1, wherein the surface of said stamped grid is coated with a metal at least in points selected from the group consisting of soldering points and welding points.

5. The magnetic field sensor as defined by claim 4, wherein said metal coating said stamped grid is tin.

6. The magnetic field sensor as defined in claim 1; and further comprising a ferromagnetic scattering disk which is located in said mount between said permanent magnet and said sensor array.

7. The magnetic field sensor as defined in claim 6, wherein said mount has elastically deformable portions for clampingly receiving elements selected from the group consisting of said permanent magnet, said sensor array, said scattering disk, and combinations thereof.

8. The magnetic field sensor as defined in claim 1, wherein said mount has an opening in a region of said sensor array.

9. The magnetic field sensor as defined in claim 1; wherein said sheathing means is composed of plastic selected from the group consisting of thermoplastic and pressure-sensitive plastic and covering said mount together with said permanent magnet, said sensor array, and parts of said conductor tracks.

10. The magnetic field sensor as defined in claim 9, wherein said sheath also covers other components.

11. The magnetic field sensor as defined in claim 1, wherein the magnetic field sensor is a sensor selected from the group consisting of an rpm sensor, a rotational direction sensor, and a position sensor.

12. The magnetic field sensor as defined in claim 1, wherein the magnetic field sensor is a sensor configured for a drive train of a motor vehicle.

* * * * *